United States Patent

Murase et al.

[11] 3,811,471
[45] May 21, 1974

[54] DUAL PRESSURE RELIEF VALVE SYSTEM
[75] Inventors: Yasuo Murase; Shizuka Takeuchi, both of Nagano, Japan
[73] Assignee: Toyoda Automatic Loom Works, Ltd., Aichi-ken, Japan
[22] Filed: Dec. 14, 1972
[21] Appl. No.: 315,006

[30] Foreign Application Priority Data
Dec. 16, 1971  Japan.......................... 46/102381

[52] U.S. Cl............................. 137/596.13, 137/489
[51] Int. Cl............................................. F16k 11/10
[58] Field of Search ...... 137/596.13, 488, 489, 490, 137/491, 492.5; 91/414, 446

[56] References Cited
UNITED STATES PATENTS
3,324,881  6/1967  Keir ............................. 137/596.13
1,830,927  11/1931  Campbell et al................. 137/489 X
3,122,064  2/1964  Douglas.......................... 137/489 X Primary Examiner—Henry T. Klinksiek
Assistant Examiner—Robert J. Miller
Attorney, Agent, or Firm—Browdy & Neimark

[57] ABSTRACT

A dual pressure relief valve system comprises a main relief valve, pilot relief valves for controlling the main relief valve at different maximum pressures, and valve spool means for controlling the direction of fluid flow within the system. The device includes internal fluid passages which eliminate the need for external piping.

6 Claims, 1 Drawing Figure

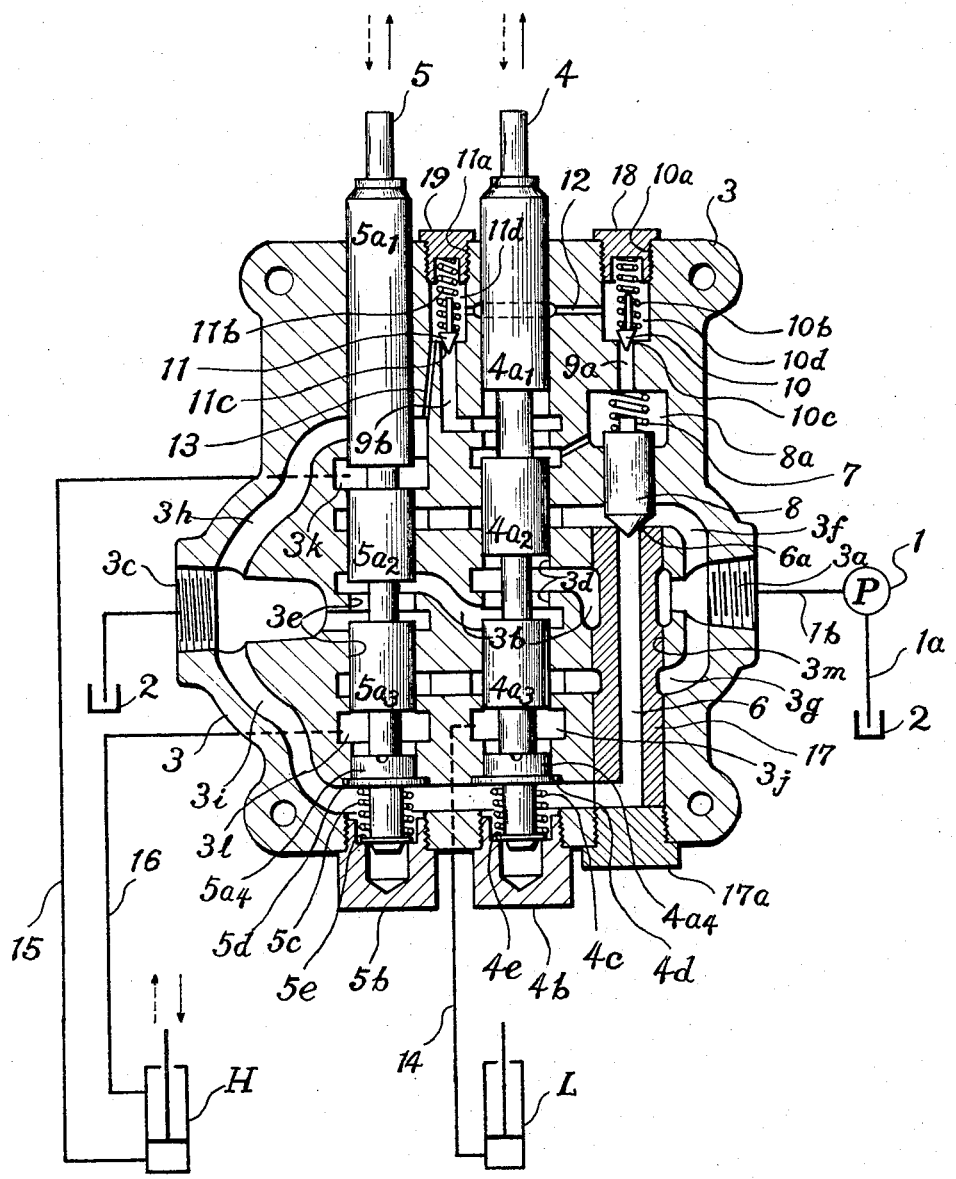

DUAL PRESSURE RELIEF VALVE SYSTEM

FIELD OF THE INVENTION

The present invention relates to a power transmission system for controlling a plurality of actuators or motors at different pressures and more particularly to a dual pressure relief valve system which is conveniently applicable to various kinds of industrial trucks and mobile road machinery, etc.

BACKGROUND OF THE INVENTION

With regard to such dual pressure relief valve systems considerable prior art devices are known, for example, Keir's U.S. Pat. Nos. 3,324,881 and 3,324,882. The present invention is an improvement of these devices.

Dual pressure relief valve systems for industrial trucks that obtain two different values of pressure are well known in the prior art but such devices are plagued by oil leakage problems. The oil leakage problems are caused, to a great extent, by externally arranged hydraulic piping and by the non-leakage proof mounting of pilot relief valves.

SUMMARY OF THE INVENTION

The shortcomings of the prior art dual pressure relief valve systems are satisfactorily overcome by the present invention. An object of the present invention is thus to overcome the defects of the prior art such as indicated above.

A further object of the present invention is to provide an improved dual pressure relief valve system in which no external piping is necessary, except connections to and/or from motors to be controlled by the relief valve.

Another object of the present invention is to provide an improved dual pressure relief valve system where a pair of leakage proof pilot relief valves are mounted separately, and yet easily replaceable or readjustable.

A further object of the present invention is to provide an improved dual pressure relief valve system where fluid leakage from external sealing portions or surfaces is minimized.

In furtherance of these and other objects, a principal feature of the present invention is a leakage proof dual pressure relief valve system in which all external piping is eliminated except that which leads to actuators or motors through the use of internal passages. Another feature of the invention is the leakage proof gasket mounted dual pressure pilot relief valves which are easily replaced or readjusted.

BRIEF DESCRIPTION OF THE DRAWING

FIG. 1 is a sectional view of an integral hydraulic control valve embodying the present invention, wherein the valve is shown in its neutral position.

For a better understanding of the invention a possible embodiment thereof will now be described with reference to the attached drawing.

DETAILED DESCRIPTION

Referring to FIG. 1, a hydraulic pump 1 which is driven by a prime mover (not shown) takes oil from a tank 2 through a suction line $1a$ and delivers oil through a delivery line $1b$ to an inlet port $3a$ of an integral valve body 3 which is an embodiment of the present invention.

Three straight bores $3m$, $3d$ and $3e$ are separately bored in parallel in the body 3. An unloading or by-pass passage $3b$ normally connects the inlet port $3a$ to an exhaust port $3c$ and communicates with bores $3d$ and $3e$, respectively, between the two ports $3a$ and $3c$.

A pair of branched passages $3f$ and $3g$ which together form a U-shape and both of which are always communicated with the inlet port $3a$ are arranged in parallel on both sides of the by-pass passage $3b$. The passages $3f$ and $3g$ are, also, communicated with the bores $3d$ and $3e$ respectively. Similarly, a pair of substantially U-shaped exhaust passages $3h$, $3i$ are always communicated with the exhaust port $3c$. The branched exhaust or return passage $3h$, also, communicates with the bore $3e$ and further with spring chamber $11d$ of the pilot relief valve 11, thereby allowing for higher maximum oil pressure. The other branched exhaust or return passage $3i$ is always in communication with the bores $3e$, $3d$ and further with an exhaust passage 6 of a relief valve 8. The passage 6 is bored in a sleeve 17 which is snugly fitted in the bore $3m$. The relief valve 8 (hereinafter called main relief valve) is constantly urged by a spring 7 toward its valve seat $6a$ which is provided at an end of the sleeve 17.

The spring 7 is confined in a chamber $8a$ to which oil under pressure is supplied through a conventional narrow passage bored in the valve 8 (not shown) from the passage $3f$. The oil further travels through a branched pilot passage $9a$ to a high pressure pilot relief valve 10 which is located on one side of valve spool 4 and through another branched pilot passage $9b$ to a lower maximum pressure pilot relief valve 11 which is located on the other side of valve spool 4. Both of the pilot relief valves 10, 11 are urged towards valve seats $10c$, $11c$ by springs $10b$, $11b$ which are supported by leakproof threaded plugs 18, 19 respectively. If necessary, gaskets may be provided at the sealing portions $10a$, $11a$, but, regardless, the springs $10b$, $11b$ are easily replaced or readjusted.

Spring chambers $10d$, $11d$ of the pilot relief valves 10, 11 are in mutual communication through a passage 12. The latter chamber $11d$ is also connected to the return passage $3h$ by a passage 13, as shown in the drawing.

It should be understood from the drawings that transverse passages 12, $9b$, $3f$, $3b$, $3g$ and $3i$ are arranged from the top to the bottom, respectively.

A motor port $3j$ which is located around the bore $3d$ and between the passages $3g$ and $3i$ is always connected to a load lifting cylinder L of an industrial truck by a hydraulic line 14.

The sleeve 17 is snugly fixed in the bore $3m$, but suitable recesses arranged around the bore $3m$ prevent the passages $3b$, $3f$ and $3g$ from being blocked off by the sleeve 17.

Valve spools 4, 5 both of which are slidably mounted in the bores $3d$, $3e$ having spaced-apart cylinders $4a_1$, $4a_2$, $4a_3$, $4a_4$; $5a_1$, $5a_2$, $5a_3$, $5a_4$; end caps $4b$, $5b$ and springs $4c$, $5c$ which are compressed between a pair of washers $4d$, $4e$, $5d$, $5e$ respectively.

Two motor ports $3k$, $3l$ are both located around the bore $3e$. The former port $3k$ is located between the passages $3f$ and $3h$, and the latter port $3l$ is located between the passages $3g$ and $3i$.

The port 3k is permanently connected to the rod end of a load handling cylinder H and the port 3l is permanently connected to the piston head end of the cylinder H by lines 15, 16 respectively.

In operation, when the valve spool 4 is shifted by hand or any shifting device in the direction indicated by the solid arrow (upward from the neutral position) the passage 9b is shut off by the cylinder $4a_2$, the passage 3b by the cylinder $4a_3$ and the passage 3g is connected to the port 3j which supplies pressurized oil to the lifting cylinder L. Under this condition the low pressure relief valve 11 is not operable and the supply oil is kept at a higher pressure which is controlled by a high pressure pilot relief valve 10 which conveniently operates the lifting cylinder L.

Conversely, when the valve spool 4 moves in the direction indicated by the dotted arrow (downward from the neutral position) the line 14 and the motor port 3j are connected to the return passage 3i and the movement of the cylinder $4a_2$ allows the low pressure pilot relief valve 11 to again become operable. This causes the main relief valve 8 to operate at the lower pressures which are determined by the low pressure pilot relief valve 11. It should be noted that the high pressure pilot relief valve 10 is also operable at the same time, but the lower valve 11 dominates.

Similarly, when the valve spool 5 is shifted in the direction of the solid arrow (upward) the passage 3g is connected to the motor port 31 and by the line 16 to the piston rod side of a load handling cylinder H of an industrial truck. Also, the motor port 3k is connected to the piston end of the cylinder H by the line 15. Thus the cylinder H is operated in the direction of the corresponding solid arrow (downward).

Conversely, when the valve spool 5 is shifted in the direction of the dotted arrow (downward), the piston of the load handling cylinder H is operated in the direction of the corresponding dotted arrow (upward).

From the description it should be understood that all the necessary functions of an industrial truck i.e., load lifting or lowering and load handling operations are perfectly performed without any external piping and with two easily replaceable or readjustable pilot relief valves. The pilot relief valves eliminate any oil leakage problems and control operating oil pressure in such a way as to generally keep the pressure at a lower level, except that when a load is being lifted a higher oil pressure is maintained.

What is claimed is:

1. In a hydraulic system comprising a fluid reservoir, a pump, a load lifting cylinder, a load handling cylinder, an inlet, an outlet, and a dual pressure relief valve system, the improvement wherein the dual pressure relief valve system comprises
   a housing;
   a main relief valve;
   pilot relief valve means including a high pressure pilot relief valve and a low pressure pilot relief valve connected thereto for controlling said main relief valve at different maximum pressures;
   fluid transferring means disposed within said housing for transporting fluid between said main relief valve and said pilot relief valve means and between said high and low pressure pilot relief valves; and valve spool means slidably displaceable within said housing for controlling the direction of fluid flow.

2. The device of claim 1 wherein said valve spool means includes a first valve spool, said first valve spool adapted when slidably displaced in a first axial direction to cause the load handling cylinder to move in a predetermined direction and when said first spool is slidably displaced in a second, opposite, direction to cause the load handling cylinder to operate in another predetermined direction.

3. The device of claim 1 wherein said valve spool means further includes a second valve spool, said second valve spool adapted when slidably displaced in a first axial direction to form a pressure inlet which is connected to the load lifting cylinder and when slidably displaced in a second, opposite, axial direction to form a pressure inlet which is connected to an outlet.

4. The device of claim 1 wherein said valve spool means is adapted when in a predetermined neutral position to communicate the pressure inlet with the fluid reservoir.

5. The device of claim 1, wherein said main relief valve includes a spring chamber, said spring chamber being connected to said high and said low pressure pilot relief valves.

6. The device of claim 5 wherein said spring chamber is directly connected to said high pressure pilot relief valve and selectively connected to said low pressure pilot relief valve by said valve spool means.

* * * * *